United States Patent

Ullein

[11] Patent Number: 6,155,942
[45] Date of Patent: Dec. 5, 2000

[54] TRACTION WHEEL FOR TENSION ELEMENT

[75] Inventor: Thomas Ullein, Stegaurach, Germany

[73] Assignee: Ina Walzlager Schaeffler OHG, Herzogenaurach, Germany

[21] Appl. No.: 09/230,882

[22] PCT Filed: Jun. 28, 1997

[86] PCT No.: PCT/EP97/03391

§ 371 Date: Feb. 2, 1999

§ 102(e) Date: Feb. 2, 1999

[87] PCT Pub. No.: WO98/05884

PCT Pub. Date: Feb. 12, 1998

[30] Foreign Application Priority Data

Aug. 5, 1996 [DE] Germany .................. 196 31 588

[51] Int. Cl.[7] ................................................. F16H 7/10
[52] U.S. Cl. .................... 474/138; 474/101; 474/110; 474/136
[58] Field of Search .................................. 474/101, 104, 474/109, 110, 112, 113, 117, 118, 133, 135, 136, 138, 139, 152, 165, 199, 902

[56] References Cited

U.S. PATENT DOCUMENTS

| | | | |
|---|---|---|---|
| 4,040,305 | 8/1977 | Cadid | 74/242.15 R |
| 4,790,801 | 12/1988 | Schmidt et al. | 474/110 |
| 5,045,029 | 9/1991 | Dec et al. | 474/112 |
| 5,073,148 | 12/1991 | Dec | 474/135 |
| 5,366,417 | 11/1994 | Shimaya | 474/112 |
| 5,419,742 | 5/1995 | Shimaya | 474/112 |
| 5,482,262 | 1/1996 | Hayakawa et al. | 474/110 |
| 5,591,094 | 1/1997 | Farmer et al. | 474/135 |
| 5,632,474 | 5/1997 | Hayakawa et al. | 474/110 |
| 5,700,216 | 12/1997 | Simpson et al. | 474/110 |

FOREIGN PATENT DOCUMENTS

| | | |
|---|---|---|
| 0 294 559 B1 | 12/1990 | European Pat. Off. . |
| 11 74 831 | 3/1959 | France . |
| 2 058 815 | 5/1971 | France . |
| 5 16 726 | 1/1931 | Germany . |
| 61 252951 | 11/1986 | Japan . |
| 62 274142 | 11/1987 | Japan . |
| 2 262 582 | 6/1993 | United Kingdom . |

OTHER PUBLICATIONS

International Search Report dated Oct. 29, 1997 for corresponding PCT Application No. PCT/EP97/03391.
German Search Report dated Dec. 10, 1996 for corresponding German Application No. 196 31 588.3.

*Primary Examiner*—Thomas R. Hannon
*Attorney, Agent, or Firm*—Volpe and Koenig, P.C.

[57] ABSTRACT

A device for tensioning a traction mechanism, preferably a chain, which includes a traction wheel, preferably a sprocket (1), rotatably mounted on a hollow axle (3). Within the hollow axle (3), a hollow piston element (5, 6) is arranged, which is biased against the hollow axle (3) using a spring element, preferably a coil spring (12). The piston element (5, 6) is arranged in a piston chamber (4) such that the longitudinal axis of the piston element (5, 6) is arranged perpendicular to the traction wheel axis. In the inner space (7) of the piston element (6), motor oil is preferably provided for hydraulic damping of the piston element (6). In order to allow enlargement of the radial extension of the spring element (12) independently of the radial extension of the inner space (7), the piston element (5, 6) contains an outer piston (5) that is biased against the hollow axle (3) by the spring element (12) and an inner piston (6) that is arranged concentrically to the outer piston (5) and provided on a face side with a contact surface (11) for bearing on the hollow axle (3).

8 Claims, 1 Drawing Sheet

TRACTION WHEEL FOR TENSION ELEMENT

BACKGROUND OF THE INVENTION

The invention presented here involves a device for tensioning a tension element, preferably a chain, having a traction wheel, preferably a sprocket, rotatably mounted on a hollow axle, and having a hollow piston element arranged within the hollow axle and sprung against the hollow axle using a spring element, preferably a coil spring. The hollow piston element is arranged in a piston chamber such that the longitudinal axis of the piston element is arranged perpendicular to the traction wheel axis, and such that hydraulic fluid, preferably motor oil, arranged in the inner space of the hollow piston element, is provided for hydraulic damping of the piston element.

A device of this general type is known, for example, from the U.S. Pat. No. 5,366,417. The spring element is arranged in the aforementioned inner space for the hydraulic fluid and supported on one side, on the piston chamber, and on the other side, on a circular ring shaped disc of the piston element, which closes the inner space. At present, the parameters that are decisive for the design of this spring element can make a radially and axially enlarged construction space necessary for the spring element. In these types of cases, the known device can, under certain circumstances, no longer be applied, since with the radial enlargement of the piston, the oil throughput increases in the hydraulic part, when the inner space is used as a pressure chamber for the hydraulic fluid.

SUMMARY OF THE INVENTION

The object of the invention presented here is thus to further construct the device forming the generic type in such a way that the use of spring elements requiring increased construction space is possible, particularly without an enlargement of the inner space of the piston element.

This object is achieved according to the invention in that the piston element contains an outer piston, which is sprung against the hollow axle by the spring element, and an inner piston that is arranged concentrically with the outer piston and provided on the face side with a contact surface for bearing on the hollow axle.

In comparison to the known device, the device according to the invention has distinct advantages: first, the design of the inner space can be made independent from the spring component. The outer piston can be constructed to be very short in the axial direction, such that on the one hand, the masses moved are reduced, and on the other hand, more axial construction space, and thus a greater spring path, are made possible for the spring element. By the introduction of the outer piston, a larger coil diameter than in the known device is possible when using a coil spring, for example.

Preferably, the inner piston is provided with a check valve that closes in the direction towards the inner space on its face side located opposite to the contact surface. By the check valve arranged according to the invention, it is made certain that the inner space is impinged upon with a comparably small pressure. The inner space is used only as a supply chamber for the hydraulic fluid in the device according to the invention. When the motor is started, the hydraulic fluid is thus immediately available to be sucked into the high pressure chamber. According to a further embodiment of the invention, a cylindrical separation wall is provided between the outer piston and the inner piston, which on the one hand, forms a guide for the inner piston, and on the other hand, forms the boundary of an annular space, in which the coil spring is arranged. The annular space is dimensioned so that the coil spring can not be subject to an undesired excursion perpendicular to its longitudinal axis. The piston chamber preferably contains the annular space for the outer piston and a cylinder space for the inner piston. The separation wall is preferably formed by the barrel of a hollow cylinder that is supported axially on the piston chamber.

According to a further embodiment according to the invention, hydraulic fluid conveyed into the annular space gets into the inner space through at least one separation wall opening provided in the separation wall and through at least one piston opening provided on the inner piston. The openings are preferably constructed in such a manner that coverage is ensured over the entire path of the piston.

An especially practical guide of the hollow axle is created on the piston chamber in that the piston chamber and the hollow axle are provided with guide surfaces acting together which are arranged parallel to the longitudinal axis of the piston component. Moments and transverse forces are introduced into the piston chamber from the hollow axle over the guide surfaces, such that the piston element stays free of these transverse forces and moments. In the known device on the other hand, weakening forces must act on the piston element perpendicular to the piston axis which are introduced via the piston guide in the piston chamber.

BRIEF DESCRIPTION OF THE DRAWINGS

In the following, the invention is explained in greater detail using a preferred embodiment which is shown as a whole in the two figures. Shown are.

DETAILED DESCRIPTION OF THE PREFERRED EMBODIMENT

Figure 1:
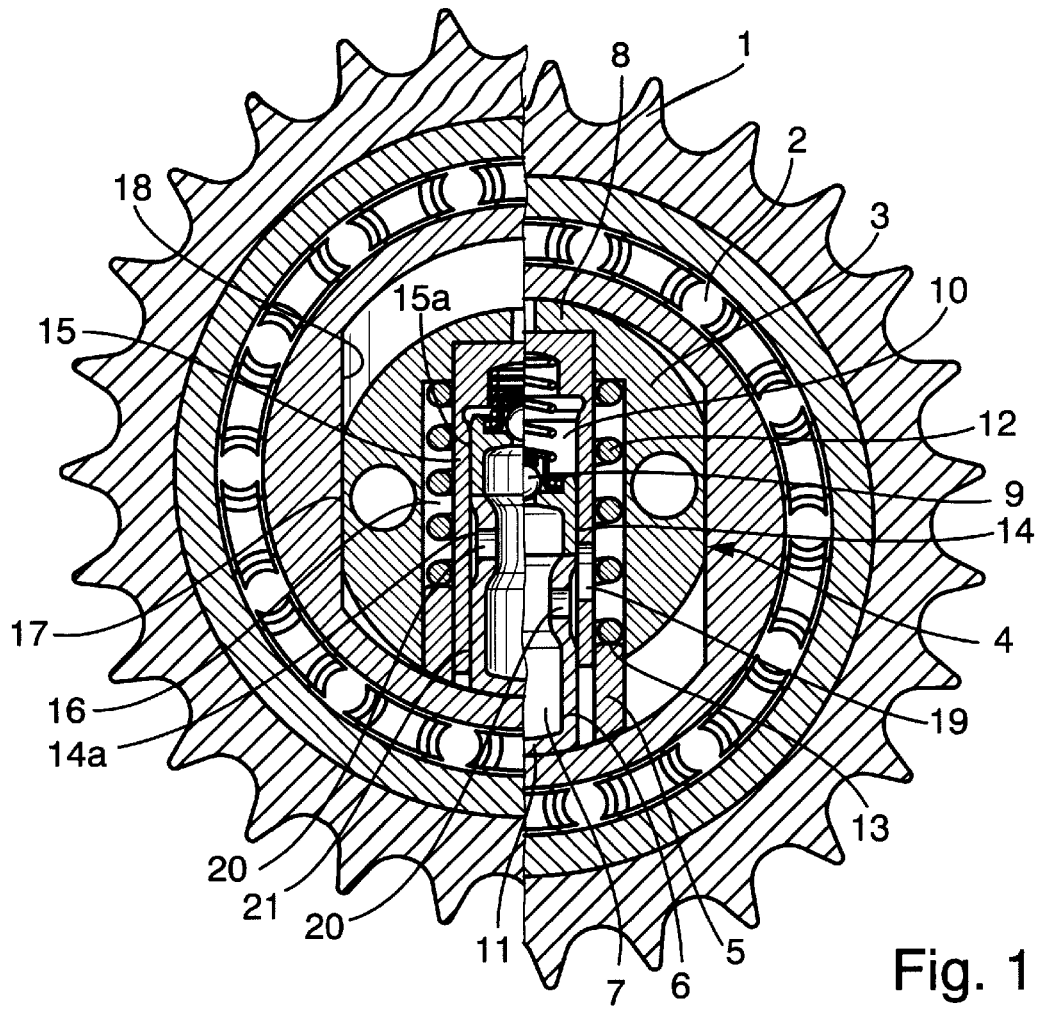
FIG. 1 a cross section through a device according to the invention in two tensioning positions that are different from each other and FIG. 2 a longitudinal section through the device according to the invention from FIG. 1.

FIG. 1 shows a device according to the invention in cross section. A sprocket 1 is rotatably mounted using a two-row radial grooved ball bearing 2 on a hollow axle 3. Within the hollow axle 3, a locationally fixed piston chamber 4 is provided, in which an outer piston 5 and an inner piston 6, which is concentric to the outer piston 5, can be moved axially. The longitudinal axis of the pistons 5, 6 is perpendicular to the sprocket axis, or the hollow axle 3. The inner piston 6 contains an inner space 7 used as a supply chamber for motor oil. The inner piston 6 is provided on the face end facing towards the base 8 of the piston chamber 4 with a check valve 9. The check valve 9 closes in the direction toward the inner space 7 and separates the inner space 7 from a high pressure chamber 10. The inner piston 6 has, on its face side end that faces away from the base 8, a piston head 11 for bearing on the hollow axle 3. The outer piston 5 is positioned on one side on the hollow axle 3, such that a coil spring 12 which is arranged coaxially to the outer piston 5 is supported on one side on a face end 13 of the outer piston 5 and on the other side on the base 8 of the piston chamber 4.

The piston chamber 4 contains a hollow cylinder 14 closed on one side, which is arranged concentrically to the longitudinal axis of the pistons 5, 6. The closed end of the hollow cylinder 14 and the check valve 9 form the boundary of the high pressure chamber 10. The barrel of the hollow cylinder 14 surrounds a cylinder space 14a for the inner piston 6 and forms a separation wall 15, which is provided between the pistons 5 and 6. The separation wall 15 forms on the one hand, a guide 15a for the inner piston 6 and, on the other hand, forms the boundary of an annular space 16 in which the coil spring 12 is arranged. The annular space 16 is dimensioned here so that the coil spring 12 can not be subject to an undesired excursion perpendicular to its longitudinal axis. In the axial direction, the ring space 16 or the axial extension of the outer piston 5 is dimensioned in such a way that a sufficiently long spring path is present for the coil spring 12.

The piston chamber 4 is provided on its outer circumference with a dihedral 17 on which the hollow axle 3 is conducted so that it can move in the longitudinal direction. For this purpose, the hollow axle 3 is provided with two guide surfaces 18 which are each arranged on one of the two sides of the dihedral 17. The dihedral 17 and the guide surfaces 18 are parallel in their axes to the longitudinal axes of the pistons 5, 6.

The separation wall 15 has several separation wall openings 19 distributed over the circumference. The inner piston 6 is provided with several piston openings 20 arranged distributed over the circumference. The openings 19, 20 are arranged in such a manner that a continuous coverage is ensured in every piston position. Between the inner piston 6 and the separation wall 15, leakage gaps 21 are provided.

Figure 2:
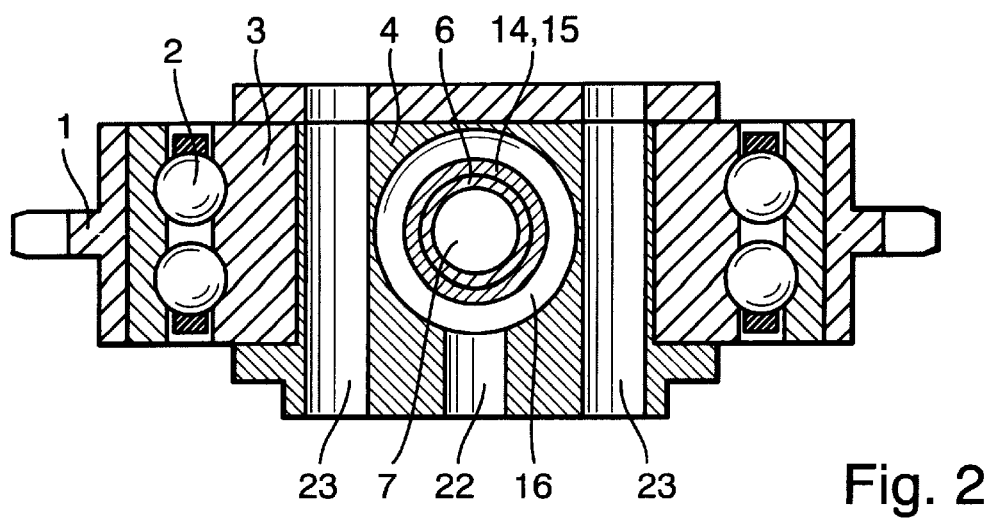

It can be understood from FIG. 2 that the piston chamber 4 is provided with a oil supply hole 22 which opens into the annular space 16. Furthermore, the piston chamber 4 is provided with two through holes 23, through which mounting bolts, not shown, for mounting the device to a housing, also not shown, can be guided.

Hereafter, the operating method of the device according to the invention is described in greater detail. The coil spring 12 biases the outer piston 5 against the hollow axle 3 in such a manner that the sprocket 1 is pressed against a chain, which is not shown. The inner piston 6 follows in the same tensioning movement of the outer piston 5, such that the check valve 9 opens and motor oil moves out of the inner space 7 into the high pressure space 10. During inward movement of the pistons 5, 6, the coil compression spring 12 is compressed, and simultaneously the volume of the high pressure space 10 is reduced because of the inner piston 6 moving in. The motor oil enclosed in the high pressure space 10 exits under pressure loss, through the leakage gaps 21 in a defined manner, out of the high pressure space 10. Enlargement of the diameter of the coil spring 12 is possible independently of the diameter of the inner piston 6. A smooth running guidance of the hollow axle 3 via the guide 17, 18 is possible as compared to the piston chamber 4, such that, in particular, the pistons 5, 6 are essentially free of undesired transverse forces.

What is claimed is:

1. Device for tensioning a traction mechanism having a traction wheel rotatably mounted on a hollow axle (3), and having a hollow piston element (5) arranged within the hollow axle (3) and sprung against the hollow axle (3) using a spring element, the hollow piston element (5) being linearly movable for the tensioning of the traction wheel and arranged in a piston chamber (4) such that the longitudinal axis of the piston element (5, 6) is arranged perpendicular to the tension wheel axis, and such that hydraulic fluid arranged in the inner space (7) of the hollow piston element (6), is provided for hydraulic damping of the piston element (6), characterized in that the piston element (5, 6) contains an outer piston (5) that is sprung against the hollow axle (3) by the spring element (12) and an inner piston (6) that is arranged concentrically to the outer piston, the inner piston (6) being provided on a face side thereof with a contact surface (11) for bearing on the hollow axle (3), a cylindrical separation wall (15) being provided between the outer piston (5) and the inner piston (6), which forms a guide (15a) for the inner piston (6), and forms a boundary of an annular space (16), in which the spring element (12) is arranged.

2. Device according to claim 1, characterized in that the inner piston (6) is provided, on a side located opposite to the contact surface (11), with a check valve that closes in the direction towards the inner space (7).

3. Device according to claim 1, characterized in that the piston chamber (4) contains the annular space (16) for the outer piston (5) and a cylinder space (14a) for the inner piston (6).

4. Device according to claim 3, characterized in that the piston chamber (4) includes a hollow cylinder (14), the barrel of which forms the separation wall (15).

5. Device according to claim 1, characterized in that hydraulic fluid conveyed into the annular space (16) flows into the inner space (7) through at least one separation wall opening (19) provided in the separation wall (15) and through at least one piston opening (20) provided in the inner piston (6).

6. Device according to claim 1, characterized in that the piston chamber (4) and the hollow axle (3) are provided with guide surfaces (17, 18) acting together, which are arranged parallel to the longitudinal axis of the piston component (5, 6).

7. Device according to claim 1 wherein the traction wheel is a sprocket (1).

8. Device according to claim 1 wherein the spring element is a coil spring (12).

* * * * *